United States Patent [19]
Holmlund et al.

[11] Patent Number: 4,478,126
[45] Date of Patent: Oct. 23, 1984

[54] CHAMBER FOR CONTAINING EXPLOSIONS, DEFLAGRATIONS OR DETONATION AND METHOD OF MANUFACTURE

[76] Inventors: Dan Holmlund, Rönnbärsvägen 6, Karlskoga, Sweden, S-691 47; Johnny Ohlson, Postlåda 8603 Kilsta, Karlskoga, Sweden, S-691 33

[21] Appl. No.: 423,339

[22] Filed: Sep. 24, 1982

[30] Foreign Application Priority Data

Sep. 22, 1981 [SE] Sweden .................. 8105585

[51] Int. Cl.³ ............................ F42B 33/02
[52] U.S. Cl. ........................ 86/1 B; 52/630; 220/71; 220/DIG. 9; 220/DIG. 24
[58] Field of Search ............ 220/71, 72, DIG. 9, 220/DIG. 24; 52/173 R, 630; 86/1 B; 109/49, 49.5

[56] References Cited

U.S. PATENT DOCUMENTS

| 1,095,759 | 5/1914 | White | 220/72 |
| 1,661,324 | 3/1928 | Davis | 220/DIG. 24 |
| 1,715,683 | 6/1929 | Stevens | 220/DIG. 24 |
| 1,769,831 | 7/1930 | Gramm | 220/71 |
| 2,779,303 | 1/1957 | Cupples | 52/630 |
| 4,326,468 | 4/1982 | King et al. | 86/1 B |

FOREIGN PATENT DOCUMENTS

| 2259524 | 12/1972 | Fed. Rep. of Germany . |
| 2082383 | 3/1970 | France . |
| 2429724 | 6/1979 | France . |
| 471726 | 6/1969 | Switzerland . |
| 992030 | 2/1962 | United Kingdom . |
| 1418484 | 5/1972 | United Kingdom . |
| 1516940 | 6/1976 | United Kingdom . |

Primary Examiner—James L. Ridgill, Jr.
Attorney, Agent, or Firm—Pollock, Vande Sande & Priddy

[57] ABSTRACT

A chamber intended for containing the effects arising from explosions, deflagrations, or detonations initiated intentionally or unintentionally inside the chamber. The chamber comprises an essentially cylindrical mantle (1) with associated sealing end pieces. Each end piece comprises an essentially flat part (2, 3) which preferably on its outside is reinforced with reinforcement members (13, 14) placed at right angles to each other. The reinforcement members are welded to each end piece and to the inner surface of the mantle, and they extend from the relevant side of each end piece in the longitudinal direction of the cylinder.

13 Claims, 14 Drawing Figures

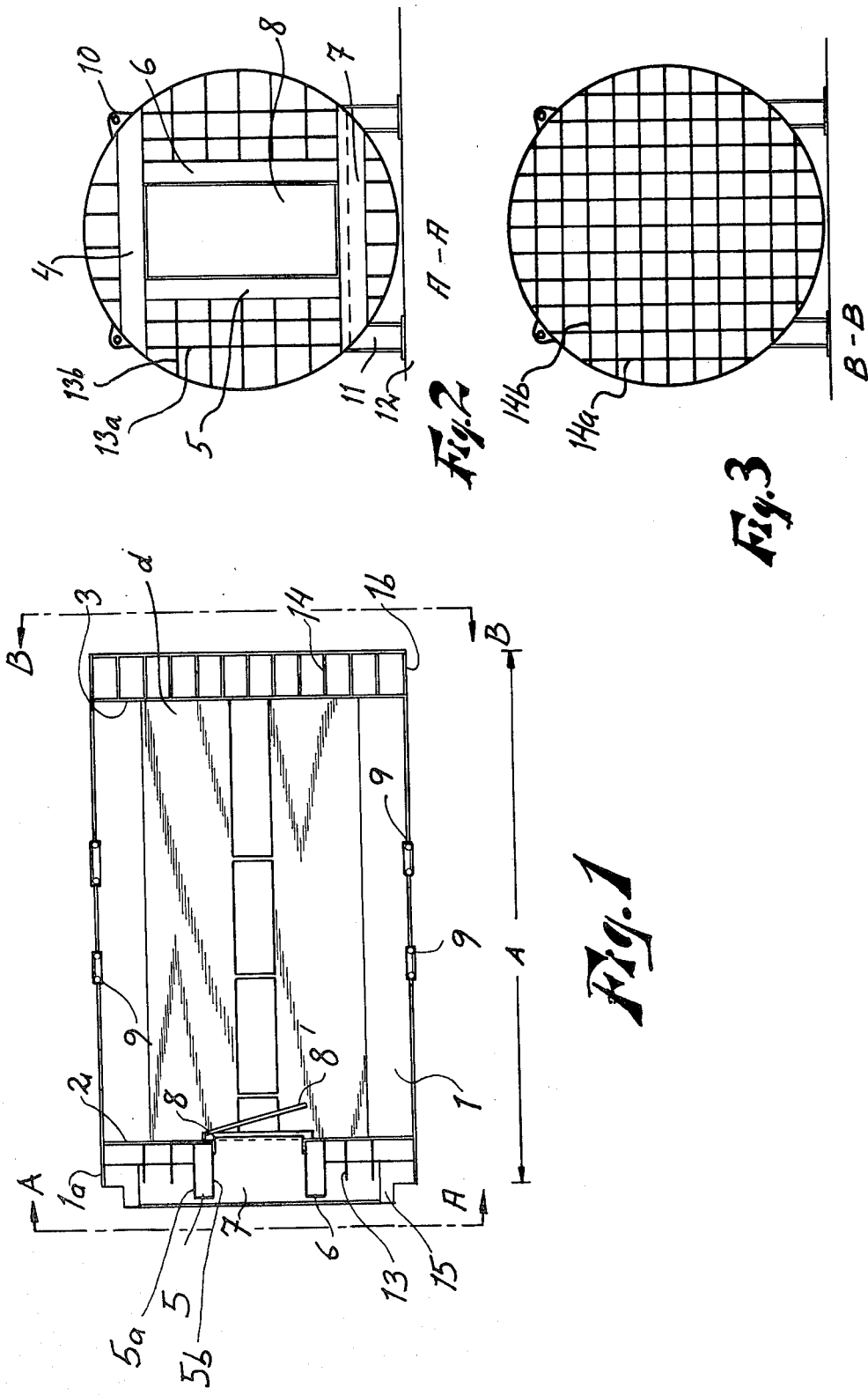

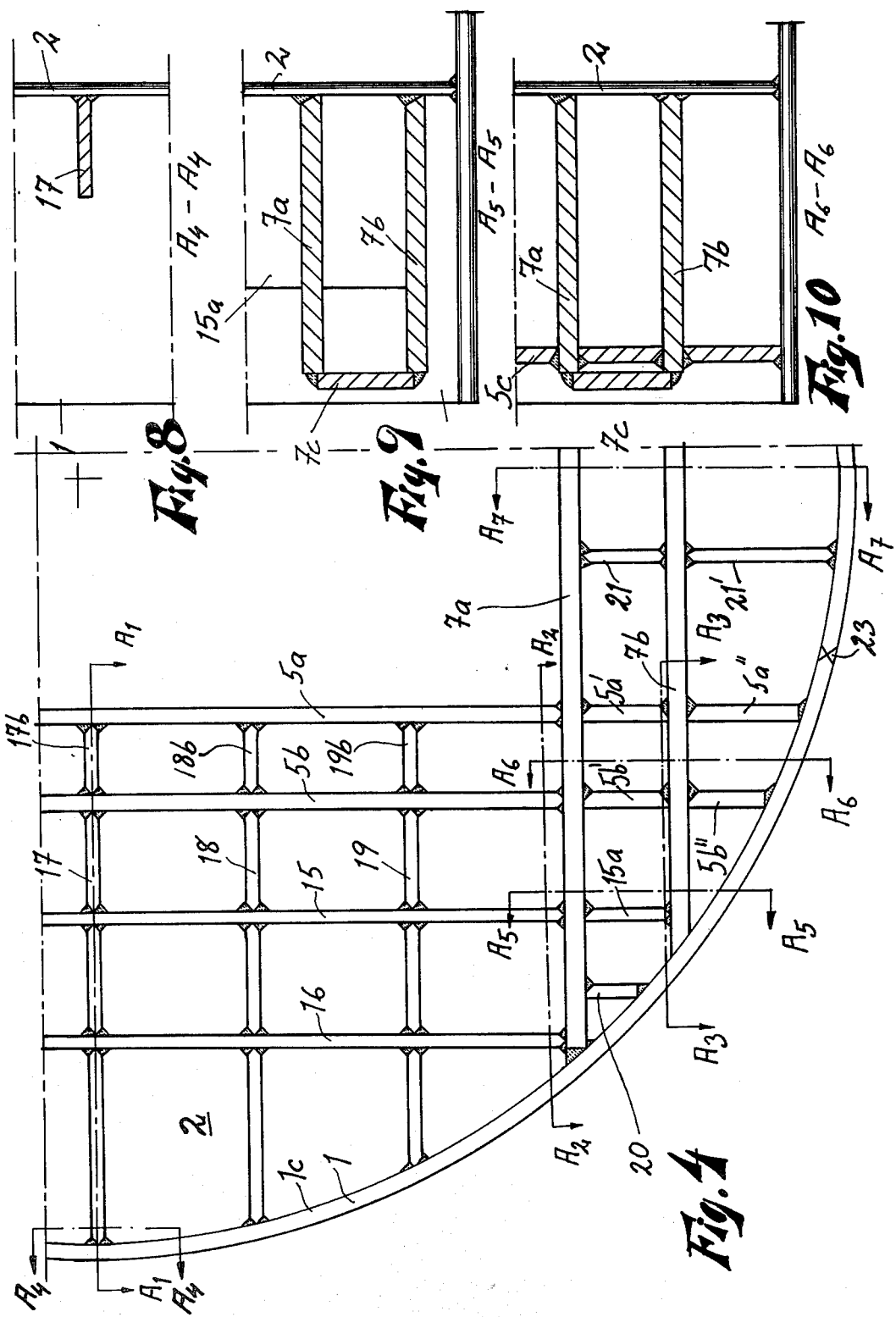

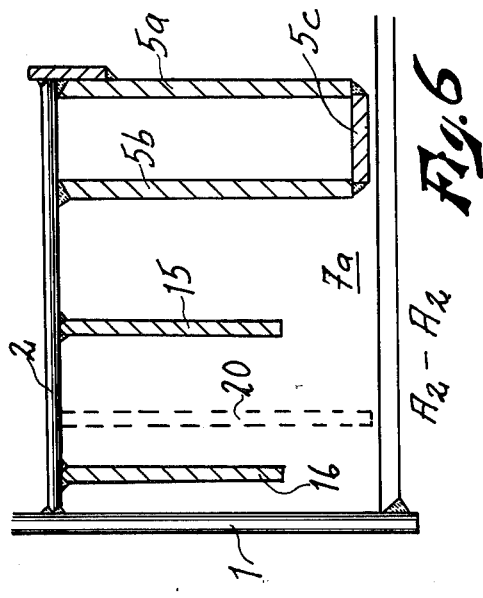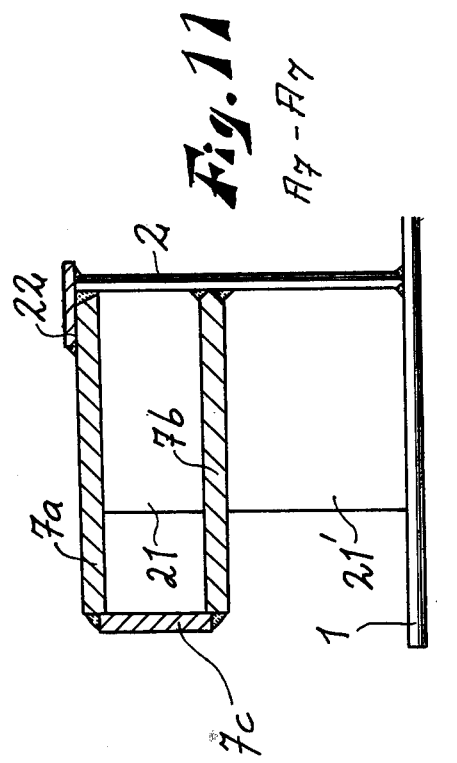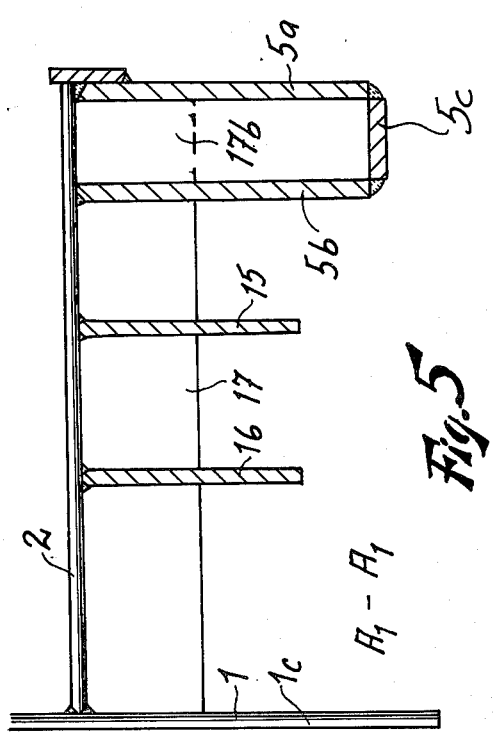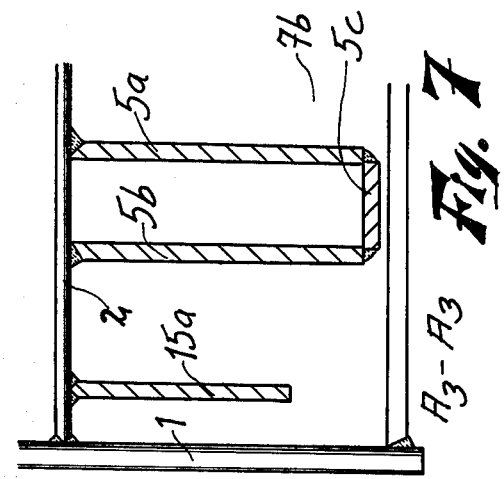

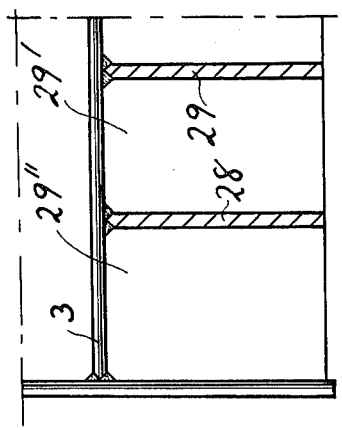
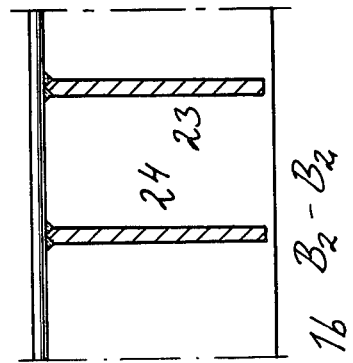
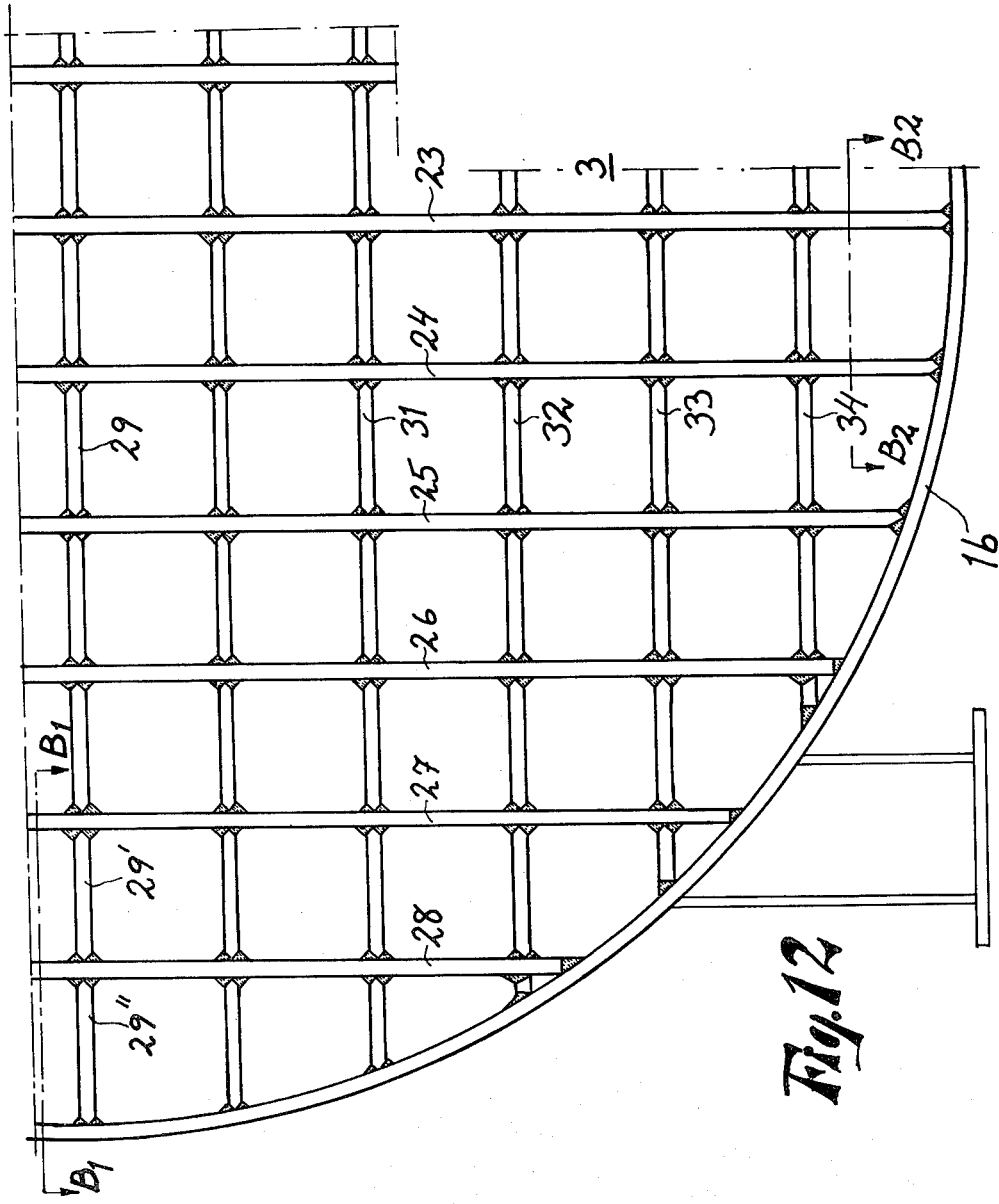

CHAMBER FOR CONTAINING EXPLOSIONS, DEFLAGRATIONS OR DETONATION AND METHOD OF MANUFACTURE

TECHNICAL FIELD

This invention relates to a chamber intended to contain the effects originating from intentional or unintentional explosions, deflagrations, or detonations inside the chamber. Such a chamber comprises a cylindrically formed mantle with associated sealed ends. The invention also relates to a method of manufacturing such a chamber.

BACKGROUND

There already exist constructions within which critical manufacturing operations tests or both are carried out in connection with the production of explosive or similar substances or both. It is also known that these and similar constructions can be utilised for the storage of explosive substances. Such construction shall in this context protect personnel and the surroundings from those effects which can occur in connection with explosions, deflagrations, and detonations, such as sound and pressure waves, shrapnel, and the like.

Thus far such constructions have almost without exception taken the form of concrete bunkers located underground or surrounded by protective walls to ensure that the critical part of the plant is kept as open as possible thereby holding damage from any explosion to a minimum.

DISCLOSURE OF THE INVENTION

Technical difficulties

It is recognised that present plants are both extremely complicated to build and difficult to adapt to processes for producing substances which are dependent on or involve explosive materials where for example a part of the process must be subjected to rigorous safety regulations associated with this type of manufacturing. It is also difficult to adapt this type of permanent plant to different types and tests of explosive materials and products. There is therefore a definite need for improved plants capable of containing the critical stages involved in the production and testing of explosive products and materials.

Solution

The chamber according to the invention is primarily intended to solve the above-mentioned difficulties. Such a chamber comprises a simple construction of relatively low weight which means that it can easily be formed to suit a specific purpose and can easily be moved, for example from the place of manufacture to the production site.

The principle characteristic of the chamber according to the invention is that each end piece has an essentially flat part or disk which is reinforced on its outside by members placed at right angles to each other and which extend in the longitudinal direction of the chamber from the actual end piece.

The invention also includes a method of manufacture for such a chamber which enables a rational production of the same and which ensures favourable strength being achieved, which in turn contributes to reducing the weight of the chamber.

The principle characteristic of the method of manufacture according to the invention is that each end piece has reinforcing members welded to its outside which extend in the longitudinal direction of the chamber, and which are placed at right angles to each other.

Further developments of the principles of the invention cover amongst other things, a more detailed description of the design of the said reinforcing members and their location on the relevant end piece. These further developments also cover a more detailed method of manufacturing the chamber according to the invention by means of welding.

ADVANTAGES

The design suggested above provides a chamber which, in spite of its technical simplicity, is extremely resistant to the effects produced by intentional or unintentional explosions, deflagrations, detonations, and the like, initiated inside the chamber. The form of the cylindrical mantle ensures great resistance to internal forces. The reinforcement of the end pieces as described in the invention ensures that the end pieces are also extremely resistant to such forces. The reinforcement members placed on edge and at right angles to each other constitute a cheap and effective stiffening of the flat parts of the end pieces. The reinforcement members, being connected to each other, are also relieved of strain by the cylinder wall via their peripheral connection to the same. Each reinforcement member is fixed to the flat part of the relevant surface via, at the very least, the greater part of its length extending over the surface.

The chamber can be factory manufactured and easily transported to the user, and its design and size can be varied and adapted to suit differing needs. It can also be used for other purposes such as resisting great external forces, in which case the reinforcement members would be located on the inside of the relevant end piece instead of the outside.

BRIEF DESCRIPTION OF DRAWINGS

A suggested design and method of manufacture for the chamber as described in the invention are given below and in the enclosed drawings, where:

FIGS. 1-3 show a plan section view and end elevation views of the chamber,

FIGS. 4-11 show in detail the reinforcement members situated on parts of a first end piece; and FIGS. 12-14 show in detail the reinforcement members situated on parts of a second end piece.

BEST MODE OF CARRYING OUT THE INVENTION

The chamber according to the invention as shown in the design example has a length A of approximately 5 meters. It comprises a mainly cylindrically formed mantle 1 having a diameter of approximately 3 meters. These dimensions can be adapted to the purpose for which the chamber is intended, such as the containment of whole or partial manufacturing processes, or the testing of explosive products such as fuzes and the like.

The mantle 1 is approximately 30 mm thick and is fitted with sealing end pieces 2 and 3 at both ends. As shown in FIGS. 1 to 3, and pieces 2 and 3 are essentially circular metal disks sealed on their circumferences to mantle 1. End piece 2 as shown in FIG. 2, is fitted with a door frame whose various parts are symbolised 4, 5, 6, and 7. A door 8 which may be of known stable design is hung on the door frame. The door which is shown ajar 8' opens inwards.

The chamber is equipped with a number of windows 9 for cameras and to permit observation and supervision of the process or test being conducted inside the chamber. These windows may be of known design. The chamber is also equipped with, though they are not specially shown, inlets for electric or gas connections, for example ignition cables. The chamber is also connected to a suction apparatus, not shown, which is coupled to or includes a blow-out tube of a silencing type. Connection to the drainage system may be provided for as well as other similar inlets. The said inlets and outlets may be known designs. A part of a flat floorplate d is drawn in FIG. 1.

The chamber is also equipped with four lifting eyes 10 and four legs 11 which allow it to be anchored on a foundation. The chamber is intended to be positioned with the cylinder more or less parallel to the foundation surface.

The end pieces 2 and 3 have a mainly flat, circular surface and a thickness of approximately 30 mm. Parts 2 and 3 are welded to the inner wall of the cylinder 1 all the way round its circumference. At each of its ends the cylinder projects out over each of the parts 2 and 3. These projecting parts are indicated 1a and 1b, and are equipped with plate-like ribs or reinforcement members 13 and 14 preferably on the outside, and which are described in more detail below. These reinforcement members extend from the relevant surface of the parts 2 and 3 and in the longitudinal direction of the mantle 1. In accordance with the FIGS. 2 and 3, part of the reinforcement members are arranged at right angles to the others. Each of the parts 2 and 3 is fitted with first vertical and second horizontal reinforcement members 13a, 14a, and 13b, 14b respectively. In the example shown, the reinforcement members are straight stiffening plates or the like, but this straight form can be varied to provide a more curved or broken pattern than those shown in FIGS. 2 and 3.

Each reinforcement member is joined along at least the greater part of, and preferably all of, its contact surface with part 2 or 3 or with the neighbouring reinforcement members or the mantle or all of these locations. The reinforcement members extend to a minimum length of 200 mm out from parts 2 and 3 and to a maximum length out from the same of 600 mm, or preferably 400 mm. The reinforcement members are to a greater extent, and preferably completely, located within the projecting parts 1a and 1b at the ends of the chamber which in a preferred design project past each reinforcement member.

Those parts of the door frame, for example 5a and 5b, which extend in the longitudinal direction of the cylinder are however rather longer than the reinforcement members and preferably are 20%–40% longer, as shown in FIG. 1. Thus extended parts can protrude somewhat outwith the projecting part 1a at the end of the chamber.

The reinforcement members have a thickness of 10–40 mm preferably approximately 25 mm. The mantle is manufactured from steel of quality OX 812 E/Z and parts 2 and 3 in the end pieces from steel of quality OX 522 E/2. The reinforcement members are made from steel of quality SS 1412 or equivalent. The design standard is StBK-N1 and the welding standard is StBK-N2.

FIGS. 4–11 show in detail the principle for attaching the reinforcement members to a part of the first end piece on the chamber. FIG. 4 does not show the exterior girder parts 5c and 7c in the box girders formed by the parts 5a, 5b, 5c, and 7a, 7b, 7c, these parts 5c, 7c being shown in FIGS. 5 and 11. The parts 4 and 6 of the door frame shown in FIG. 2 have the same design as the frame parts 5 and 7.

The parts 5a, 5b, 7a, and 7b together with the equivalent parts of the frame parts 4 and 6 are included in the reinforcement member arrangement. In the case shown the vertical parts 5a and 5b in the first reinforcement member, and 7a and 7b in the second reinforcement member are included. The reinforcement members also include the vertical part 15 and 16 while the other reinforcement members include further horizontal parts 17, 18, and 19.

The horizontal reinforcement member 17 comprises a part 17b which is attached between the parts 5a and 5b, together with a part which extends from the part 5b and through cut-outs in the vertical reinforcement members 15 and 16 and out to the inner surface 1c of the mantle. The horizontal parts 18 and 19 which are arranged in the equivalent manner with the parts 18b and 19b between the parts 5a and 5b. Those vertical reinforcement members which have through-going cut-outs are of a somewhat greater length out from the outside of the parts 2 and 3.

The vertical reinforcement member 15 comprises an unbroken part with cut-outs for the reinforcement members 17, 18, 19, and a separate part 15a between parts 7a and 7b. The combined reinforcement and box girder member 5b comprises an unbroken part to which the parts 17, 17b, 18, 19, 19b, are attached on mutual sides, parts 5b' between the reinforcement member 7a and 7b, and the part 5b'' between the reinforcement member 7b and the mantle surface 1c. The combined reinforcement and box girder 5a is constructed in an equivalent manner with the parts 5a' and 5a''.

Also included in the vertical reinforcement members is an independent part 20 located between the reinforcement member 7a and the inner wall 1c. A further two independent members 21, 21' between the members 7a and 7b and the member 7b and the inner surface 1c can be assumed to be included in the first reinforcement members or the vertical reinforcement members.

The above described design is in principle the same for the other three quarters of the relevant end piece cross section. The reinforcement members which are a part of the door frame are thicker than the other reinforcement members, namely approximately 40 mm, while the said other reinforcement members have a thickness of approximately 25 mm. The quantity of first and second reinforcement members can vary between 9 and 15 preferably; that is, totally between 18 and 30.

Each reinforcement member is welded to all its contact surfaces i.e., both the underlying part and neighbouring reinforcement member/mantle surface. The reinforcement members as described above include horizontal and vertical reinforcement members each of which comprise one or more individual parts. The arrangement of reinforcement members can however be constructed in other ways, for example the vertical reinforcement members 15 and 16 and can be made as one piece which passes through cut-outs in the relevant horizontal reinforcement members. In the case of a greater quantity of individual parts in the respective horizontal or vertical reinforcement members the parts can be moved parallel to each other or placed at an angle or both, and so forth. It is however advantageous that those reinforcement members which are a part of the box girders remain unbroken. The above described arrangement of reinforcement members achieves a construction which from the point of view of resistant strength in the end pieces as such, is most advantageous. FIG. 4 shows also a joint 23 which extends in the longitudinal direction of the mantle, with only one joint per section of mantle.

The reinforcement members for the opposite end piece as shown in FIG. 12 have a number of through-going vertical members 23–28 which are attached at their ends to the inner surface of the mantle at 1b and along the entire contact surface with the end piece 3. The horizontal reinforcement members 29–34 comprise a number of individual members which, with the exception of to the part 3, are attached between its own pair of vertical reinforcement members, with the exception of the outermost which is attached to the mantle surface and the reinforcement member 28. The division between the horizontal and vertical reinforcement members is essentially the same so that a pattern of squares, triangles, and quadrangles having a circular side is formed. The design is identical for the other sections of the end piece cross-section. The vertical member 23 coincides with the vertical centre axis and the horizontal member 29 with the horizontal centre axis. On the other hand in the cross-section as shown in FIG. 4, the division is somewhat irregular due to the arrangement with a door frame consisting of box girders. The distance between the outermost member 16 and the inner surface of the cylinder is also relatively great as shown in FIG. 4.

One method of manufacturing the above described chamber includes welding the lateral edges of the mantle (welding class SV3), which involves each half being welded simultaneously on both sides and from the centre outwards. The flat end pieces are welded to the mantle. In the case of the other end piece as shown in FIG. 12, the vertical members 23–26 are tack welded in the order from the mantle in towards the centre. They are then welded in the opposite order, from the centre outwards in both directions. The tacking is ground away as the welding progresses. The individual parts are welded in the same order in each quadrant simultaneously. Attachment to the inner surface of the mantle is carried out non-stop. The material is pre-heated to 100°–150° C. for welding. Horizontal welding as well as manual metal arc welding are utilised. After welding the joints are ground.

Manufacturing of the first end piece can take place simultaneously with, before or after, manufacturing of the second end piece, and in principle is carried out in the same way. The reinforcement members 7b, 7a, 20, 15a, 15b', 15a', and 21 are tack welded in the order stated and welded in the opposite order. Welding is carried out from the centre in both directions. The tacking is ground away as the welding progresses. The reinforcement members 5b, 51, 17b, 17, 18b, 18, 19b, 19, 5b'', 5a'', 21, 21', 15, 20, 15c, 7c, and so on are tack welded and welded in the order stated. The order is the same in each quadrant and welding is carried out simultaneously. Also in this case the material is preheated to 100°–150° C.

The welding method described above achieves a high standard of jointing of the reinforcement members to each end piece 2 and 3, and to the mantle, while tension being introduced to various parts of the chamber is avoided.

The invention is not limited to the above stated designs but can be subject to modification within the framework of the patent claims.

We claim:

1. An improved chamber for containing the effects of explosions, deflagrations or detonations occurring within the chamber, said chamber comprising:
   an essentially cylindrical mantle having a longitudinal axis, first and second opposite ends and an inner wall;
   first and second essentially circular disks welded at their respective circumferences to said inner wall at locations spaced inwardly from said first and second opposite ends;
   a first plurality of stiffening plates affixed on edge to the outer surface of said first circular disk and extended in said longitudinal direction;
   a second plurality of stiffening plates affixed on edge to the outer surface of said second circular disk and extended in said longitudinal direction;
   a third plurality of stiffening plates affixed on edge to the outer surface of said first circular disk and extended in said longitudinal direction and at traverse angles to said first plurality of stiffening plates; and
   a fourth plurality of stiffening plates affixed on edge to the outer surface of said second circular disk and extended in said longitudinal direction and at traverse angles to said second plurality of stiffening plates.

2. An improved chamber according to claim 1, wherein said stiffening plates terminate at locations spaced essentially inwardly from said opposite ends and at least a portion of said stiffening plates are affixed at their ends to said inner wall.

3. An improved chamber according to claim 1, wherein said mantle has an overall length of approximately 5 meters, a wall thickness of approximately 30 millimeters and a diameter of approximately 3 meters; and said stiffening plates have a thickness of 10 to 40 millimeters and extend from 200 to 600 millimeters in said longitudinal direction.

4. An improved chamber according to claim 1, wherein said first and third pluralities of stiffening plates and said second and fourth pluralities of stiffening plates, respectively, extend at right angles to each other.

5. An improved chamber according to claim 1, wherein said first and third pluralities of stiffening plates form a door frame on said first circular disk, further comprising an inwardly opening door hung on said door frame.

6. An improved chamber according to claim 5, wherein the stiffening plates forming said door frame extend from 20% to 40% further in said longitudinal direction than the remainder of said stiffening plates.

7. A method of manufacturing a chamber for containing the effects of explosions, deflagrations or detonations occurring within the chamber, said method comprising the steps of:
   providing an essentially cylindrical mantle having a longitudinal axis, first and second opposite ends and an inner wall;
   providing first and second essentially circular disks;
   welding said first and second circular disks at their circumferences to said inner wall at locations spaced inwardly from said first and second opposite ends;
   providing first, second, third and fourth pluralities of stiffening plates;

welding said first and second pluralities on edge to said first circular disk with said plates extended in said longitudinal direction and with said first plurality extended at transverse angles to said second plurality; and welding said third and fourth pluralities on edge to said second circular disk with said plates extended in said longitudinal direction and with said third plurality extended at transverse angles to said fourth plurality.

8. A method according to claim 7, wherein said mantle has a longitudinally extending joint, further comprising the step of welding said joint commencing at the center of said mantle and proceeding outwardly toward said opposite ends.

9. A method according to claim 7, wherein said first plurality of said stiffening plates is welded in place on said first circular disk before said second plurality; and said third plurality of said stiffening plates is welded in place on said second circular disk before said fourth plurality.

10. A method according to claim 7, wherein said welding of said stiffening plates commences at the center thereof and proceeds outwardly toward the circumferences of said circular disks.

11. A method according to claim 7, further comprising the step of welding the ends of at least a portion of said stiffening plates to said inner wall.

12. A method according to claim 7, wherein said welding of said stiffening plates commences with plates attached near the center of each of said circular disks and proceeds outwardly toward the circumference of said circular disks.

13. A method according to claim 12, further comprising the steps of forming a portion of said stiffening plates on one of said circular disks into a door frame; providing a door; and hanging said door to open inwardly on said frame.

* * * * *